United States Patent Office 3,015,657
Patented Jan. 2, 1962

3,015,657
1-CARBALKOXY-4-(AMINOALKANOL) PIPERAZINES
Charles F. Geschickter, Lorton, Va.; John S. Pierce, 813 Roseneath Road, Richmond, Va.; Ying H. Chen, 6745 Miami Ave., Richmond, Va.; and Ebenezer E. Reid, 302 E. 33rd St., Baltimore, Md.
No Drawing. Filed May 28, 1959, Ser. No. 816,403
7 Claims. (Cl. 260—247.2)

This invention relates to novel compositions of matter and more particularly to the production of unsymmetrically substituted piperazines.

The compounds embraced by the present invention possess useful therapeutic properties in that they have been found to exhibit important antitussive activity. In addition, they are useful intermediates for the chemical syntheses of other therapeutic compositions.

It is therefore a primary object of the present invention to provide novel therapeutic compositions.

Another object of the invention is to provide novel unsymmetrically substituted piperazines.

Another object of this invention is to provide novel chemical compositions constituting intermediates for the production of useful therapeutic agents.

Still another object of the invention is to provide a novel method of producing unsymmetrically substituted piperazines.

These and further objects and advantages of the invention and the manner in which they are accomplished will be more apparent from the following description of the class of compounds and the specific examples and methods of obtaining them.

The novel therapeutically and medicinally useful compounds of the present invention are 1-carbalkoxy-4-(aminoalkanol) piperazines and their non-toxic acid addition salts. The free bases may be represented by the following formula:

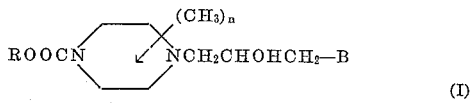

(I)

in which R is an alkyl radical containing from 1 to 4 carbons, n is a number from 0 to 4 and in which B is a member of the group made up of morpholino, pyrrolidino, piperidino, monomethylpiperidino and

in which R′ and R″ each is an alkyl radical containing from 1 to 4 carbons.

The compounds of the structure shown in Formula I are purified by vacuum distillation and as thus prepared are nearly colorless oils.

The compounds of the above structure are soluble in ethanol and in ether. The simplest member,

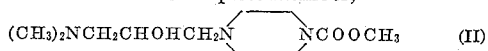

(II)

is quite soluble in water. Also, the corresponding morpholino derivative is soluble in water. In general, increase in molecular weight causes a decrease in water solubility. While the higher members are only slightly soluble in water, all of the compounds of Formula I of the present invention dissolve readily in dilute hydrochloric acid.

The compounds of structure

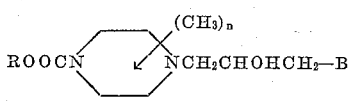

(I)

of the present invention are prepared by one or more of the following type reactions:

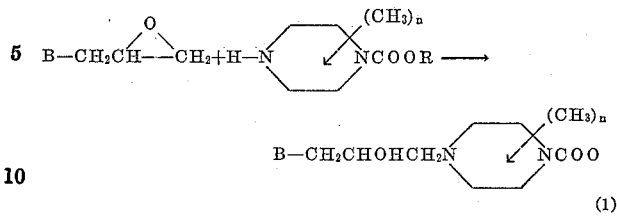

(1)

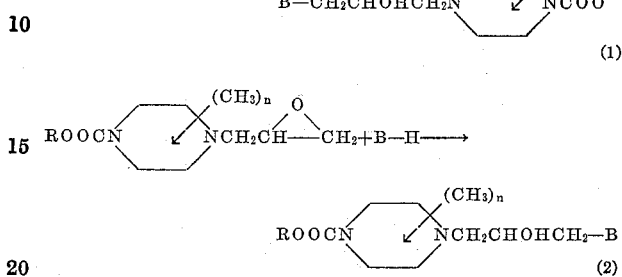

(2)

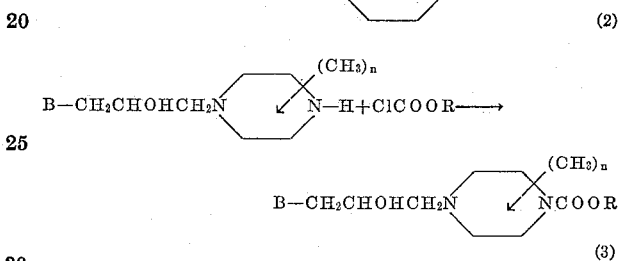

(3)

Method No. (1) is the preferred method for all of the syntheses except when B is $(CH_3)_2N$.

Method No. (2) can be used for the preparation of all compounds disclosed in the present application.

Method No. (3) was used in the preparation of several compounds but has the disadvantage that ester formation as well as urethane formation may take place. Purification was more difficult when Reaction No. (3) was used than in the other syntheses.

In Method No. (1) and Method No. (2) 1-carbalkoxy-piperazines of the structure

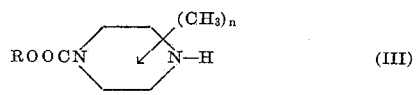

(III)

are used as intermediates. The compounds of structure III were prepared, with slight modification in some cases, by the reaction of ClCOOR with piperazines of the structure

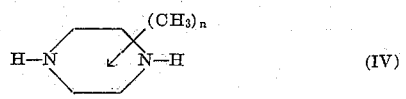

(IV)

according to the procedure reported in an article by T. S. Moore, M. Boyle and V. M. Thorn, J. Chem. Soc., 1929, part I, page 39.

The following examples are illustrative only and are not intended to limit the invention in any way. All parts are by weight unless otherwise stated. All temperatures are uncorrected and are on the centigrade scale.

EXAMPLE 1

A mixture of 9.25 g. (0.05 mole) of 3-di-n-butylamino-1,2-epoxypropane, 8.63 g. (0.05 mole) of 1-carbopropoxypiperazine and 50 ml. of 95% ethanol was allowed to stand for one week and then was heated in a water bath at approximately 75° for 8 hours. The reaction mixture was distilled under reduced pressure. 1-carbopropoxy-4-(3-dibutylamino-2-hydroxypropyl)piperazine was obtained in a yield of 11 g. (61%) at 162–164° at 0.12 mm.

Similarly, by reaction of 3-di-n-butylamino-1,2-epoxypropane with 1-carbopropoxy-3-methylpiperazine there was obtained 1-carbopropoxy-4-(3-dibutylamino-2-hydroxypropyl)-3-methylpiperazine. The 1-carbopropoxy-3-methylpiperzine contained mixed with it some 1-carbopropoxy-2-methylpiperazine. This latter product, with the 3-di-n-butylamino-1,2-epoxypropane, yielded 1-carbopropoxy-4-(3-dibutylamino - 2 - hydroxypropyl)-2-methylpiperazine.

By similar procedure, but by allowing a standing time at room temperature of two weeks and a heating time in the water bath of 30 hours, 3-di-n-butylamino-1,2-epoxypropane and 1-carbobutoxy - 3,5 - dimethylpiperazine yielded 1-carbobutoxy-4-(3-dibutylamino-2-hydroxypropyl)-3,5-dimethylpiperazine. The 1-carbobutoxy-3,5-dimethylpiperazine contained mixed with it some 1-carbobutoxy-2,6-dimethylpiperazine. This latter compound, with the epoxide used just above, yielded 1-carbobutoxy-4-(3-dibutylamino - 2 - hydroxypropyl)-2,6-dimethylpiperazine.

EXAMPLE 2

A mixture of 4.0 g. of 3-diethylamino-1,2-epoxypropane and 2.4 g. of 1-carbethoxy-2,3,5,6-tetramethylpiperazine was let stand for 3 weeks with frequent mixing and then was heated in a water bath for 30 hours. On distillation there was obtained 3.0 g. (47%) of 1-carbethoxy - 4 - (3 - dimethylamino - 2 - hydroxypropyl)-2,3,5,6-tetramethylpiperazine, boiling at 166–168° at 0.35 mm.

EXAMPLE 3

A mixture of 4.7 g. of 3-piperidino-1,2-epoxypropane and 7.0 g. of 1-carbomethoxy-2,3,5,6-tetramethylpiperazine was allowed to stand for 3 weeks with frequent mixing and was heated on a water bath for 30 hours. On distillation there was obtained 5.5 g. (47%) of 1-carbomethoxy-4-(3-piperidino - 2 - hydroxypropyl)-2,3,5,6-tetramethylpiperazine boiling at 170–172° at 0.45 mm. pressure.

EXAMPLE 4

A mixture of 3.6 g. of 3-morpholino-1,2-epoxypropane and 4.7 g. of 1-carbethoxy-trans-2,5-dimethylpiperazine was let stand for one week with frequent mixing and was heated in a water bath for 12 hours. The reaction mixture yielded 6.0 g. (72%) of 1-carbethoxy-4-(3-morpholino-2-hydroxypropyl)-trans-2,5-dimethylpiperazine at 165–168° at 0.25 mm. pressure.

EXAMPLE 5

A mixture of 7.0 g. each of 3-morpholino-1,2-epoxypropane and 1-carbomethoxy - 2,3,5,6 - tetramethylpiperazine was allowed to stand for 3 weeks with frequent mixing and was heated for 25 hours in a water bath. On vacuum distillation there was obtained 5.8 g. (49%) of 1-carbomethoxy-4-(3-morpholino - 2 - hydroxypropyl)-2,3,5,6-tetramethylpiperazine at 179–180° at 0.50 mm.

EXAMPLE 6

A mixture of 5.0 g. (0.029 mole) of 1-carbopropoxypiperazine, 2.7 g. (0.029 mole) of epichlorohydrin and 10 ml. of ethanol was allowed to stand at room temperature for 14 hours. To the reaction mixture 10 ml. of 6 N sodium hydroxide was added and the mixture was stirred for 15 minutes. To this basic mixture was added 25 ml. of dimethylamine (25% in water) and the reaction mixture was allowed to stand for one hour. Another 25 ml. of dimethylamine solution was added and the mixture was allowed to stand for four days. Then 100 ml. of 6 N sodium hydroxide was added and the mixture was extracted with 100 ml. of ether. The ether extract was filtered and the ether was removed by vacuum evaporation. The residue, on distillation yielded 6.0 g. (75%) of 1-carbopropoxy-4-(3-dimethylamino-2-hydroxypropyl) piperazine, boiling at 144–146° at 0.40 mm. pressure.

EXAMPLE 7

A mixture of 5.0 g. (0.025 mole) of 1-carbomethoxy-2,3,5,6-tetramethylpiperazine and 2.8 g. (0.030 mole) of epichlorohydrin was allowed to stand for 8 days. Twenty ml. of butanol was added and the solution was heated in a rotary vacuum evaporator in a water bath at 75° for three hours. To the residue was added 50 ml. of dimethylamine (25% in water) and the mixture was allowed to stand for four days. The mixture was treated with 20 ml. of 6 N sodium hydroxide and was extracted with 100 ml. of ethyl ether. The ether extract was dried over anhydrous potassium carbonate, filtered and vacuum evaporated. The residue on distillation yielded 2.6 g. (33%) of 1-carbomethoxy - 4 - (3 - dimethylamino-2-hydroxypropyl) - 2,3,5,6 - tetramethylpiperazine boiling at 145–147° at 0.40 mm.

EXAMPLE 8

A mixture of 6.0 g. (0.0347 mole) of carbopropoxypiperazine and 3.7 g. (0.040 mole) of epichlorohydrin was allowed to stand for 12 hours. Twenty ml. of butanol was added and the mixture was heated in a vacuum evaporator in a water bath at 75° for two hours. The residue was cooled to room temperature and was treated with 15 ml. of 6 N sodium hydroxide over a period of 30 minutes. Then 8 ml. of pyrrolidine was added and the mixture was well agitated. After standing for 12 hours the mixture was heated in the water bath for 20 hours. It was treated with 15 ml. of 6 N sodium hydroxide solution and was extracted with 100 ml. of ethyl ether. The ether layer was dried over anhydrous potassium carbonate and filtered and the ether was vacuum evaporated. The residue on distillation yielded 5.6 g. (58%) of 1-carbopropoxy-4-(3-pyrrolidino-2-hydroxypropyl) piperazine boiling at 165-167° at 0.25 mm.

EXAMPLE 9

A mixture of 7.0 g. of 1-carbopropoxy-2,3,5,6-tetramethylpiperazine and 3.0 g. of epichlorohydrin was allowed to stand for 6 days. To the reaction mixture 20 ml. of butanol was added and volatile material was removed by heating in a rotary vacuum evaporator on a water bath for 2.5 hours. To the residue 15 ml. of 6 N sodium hydroxide was added slowly with thorough mixing over a period of 30 minutes. Then 8 ml. of pyrrolidine was added and the products were well mixed. After standing for four hours the reaction mixture was heated for 12 hours in a water bath. It was cooled, treated with 15 ml. of 6 N sodium hydroxide solution and extracted with 100 ml. of ether. The ether was dried over anhydrous potassium carbonate and was removed by vacuum evaporation. On distillation of the residue there was obtained 2.5 g. of 1-carbopropoxy-4-(3-pyrrolindino-2-hydroxypropyl) - 2,3,5,6 - tetramethylpiperazine, boiling at 168–170° at 0.35 mm.

EXAMPLE 10

After a mixture of 6.0 g. of 1-carbethoxy-cis-2,5-dimethylpiperazine and 3.5 g. of epichlorohydrin had been allowed to stand for 5 days, it was treated with 25 ml. of butanol. Volatile material was removed by heating in a rotary evaporator in a water bath at 75° for four hours. To the residue 15 ml. of 6 N sodium hydroxide solution was added slowly, with shaking. Then 2.8 g. of morpholine was added, the mixture was allowed to stand overnight and was heated on a water bath for 12 hours. The reaction mixture was treated with 15 ml. of 6 N sodium hydroxide and was extracted with 100 ml. of ether. The ether extract was dried over potassium carbonate and vacuum evaporated. The residue on distillation yielded 6.2 g. of 1-carbethoxy-4-(3-morpholino-2-hydroxypropyl)-cis-2,5-dimethylpiperazine, boiling at 168–170° at 0.35 mm.

EXAMPLE 11

A mixture of 7.0 g. of 1-carbopropoxy-2,3,5,6-tetramethylpiperazine and 3.0 g. of epichlorohydrin was allowed to stand for 5 days. It was treated with 25 ml. of butanol and volatile material was removed by heating in a rotary evaporator in a water bath at 75° for four hours. To the residue was added slowly 15 ml. of 6 N sodium hydroxide solution. Then 2.8 g. of morpholine was added and the mixture was allowed to stand for 12 hours. It then was heated in a water bath for 15 hours, cooled and treated with 15 ml. of 6 N sodium hydroxide. The mixture was extracted with 100 ml. of ether. The ether layer was dried over potassium carbonate and the ether was vacuum evaporated. The residue was vacuum distilled. Yield of 1-carbopropoxy-4-(3-morpholino-2-hydroxypropyl)-2,3,5,6-tetramethylpiperazine boiling at 183–185° at 0.40 mm., 3.0 g. (26%).

EXAMPLE 12

To a mixture of 6.0 g. of 1-(3-dibutylamino-2-hydroxypropyl)-trans-2,5-dimethylpiperazine, 1 ml. of triethylamine and 60 ml. of 95% ethanol mechanically stirred in an ice-salt bath was added slowly 1.8 g. of methylchloroformate at a rate so that the temperature of the reaction mixture did not rise above 0°. Then 15 ml. of 6 N sodium hydroxide solution was added. After 10 minutes of stirring another portion of 50 ml. of 6 N sodium hydroxide was added. The reaction mixture was extracted with two 30 ml. portions of ether. The combined ether extracts were filtered and the ether was removed by vacuum evaporation. The residue on distillation yielded 2.0 g. (30%) of 1-carbomethoxy-4-(3-dibutylamino - 2 - hydroxypropyl) - trans - 2,5 - dimethylpiperazine, boiling at 150–153° at 0.25 mm.

EXAMPLE 13

To a mechanically stirred solution of 5.4 g. of 1-[3-(2 - methylpiperidino)2 - hydroxypropyl] cis - 2,5 - dimethylpiperazine in 60 ml. of ether in a salt-ice water bath was added slowly 1.8 g. of methylchloroformate in 10 ml. of ether. The temperature was kept below 0°. The reaction mixture was treated with 20 ml. of 6 N sodium hydroxide over a period of 10 minutes. An additional 50 ml. of 6 N sodium hydroxide solution was added and the reaction mixture was extracted with two 30 ml. portions of ether. The combined ether extracts were filtered and the ether was removed by vacuum evaporation. The residue on vacuum distillation yielded 2.0 g. (29%) of 1-carbomethoxy-4-[3-(2-methylpiperidino)-2-hydroxypropyl]-cis-2,5-dimethylpiperazine, boiling at 174–176° at 0.30 mm.

EXAMPLE 14

A cooled mechanically stirred mixture of 5.2 g. of 1 - (3 - morpholino - 2 - hydroxypropyl) - cis - 2,5 - dimethylpiperazine, 1 ml. of triethylamine and 60 ml. of 95% ethanol was treated slowly with 1.8 g. of methylchloroformate in 10 ml. of ether, the temperature being kept below 0°. Then 15 ml. of 6 N sodium hydroxide was added and the reaction mixture was stirred for 10 minutes. Another portion of sodium hydroxide, 100 ml. of 6 N, was added. The reaction mixture was extracted with two 50 ml. portions of ether. The combined ether extracts were filtered and the ether was removed by vacuum evaporation. The residue on distillation yielded 2.0 g. (30%) of 1-carbomethoxy-4-(3-morpholino-2-hydroxypropyl)-cis-2,5-dimethylpiperazine, boiling at 175–177° at 0.25 mm. pressure.

The compounds of the present invention form salts with inorganic acids as hydrochloric acid, hydrobromic acid, sulfuric acid, and phosphoric acid and with organic acids as acetic acid, lactic acid, citric acid, caproic acid, tartaric acid, and thiodisalicylic acid.

Following is a table listing some of the various specific compounds produced, the method used in obtaining the compounds and data for identifying each of the compounds:

Table

1-CARBALKOXY-4-(AMINOALKANOL)-PIPERAZINES

| $n$ | B | R | Method | B.P., °C. | Pressure, mm. Hg | Titrable N, Percent* | |
|---|---|---|---|---|---|---|---|
| | | | | | | Calc'd | Found |
| 0 | Dimethylamino | Propyl | 2 | 144–146 | .40 | 10.25 | 10.05 |
| 0 | Diethylamino | Methyl | 1 | 152–155 | .40 | 10.25 | 9.97 |
| 0 | do | Ethyl | 1 | 138–140 | .20 | 9.75 | 9.86 |
| 0 | do | Propyl | 2 | 155–157 | .30 | 9.30 | 9.21 |
| 0 | do | Butyl | 1 | 172–178 | .40 | 8.89 | 8.90 |
| 0 | Dibutylamino | Ethyl | 1 | 175–179 | .30 | 8.16 | 8.11 |
| 0 | do | Propyl | 1 | 162–4 | .12 | 7.84 | 7.66 |
| 0 | do | Butyl | | 176–178 | .20 | 7.54 | 7.26 |
| 0 | Morpholino | Methyl | 1 | 168–170 | .45 | 9.75 | 9.53 |
| 0 | do | Ethyl | 1 | 205–211 | .50 | 9.30 | 9.23 |
| 0 | do | Butyl | 1 | 200–205 | .60 | 8.50 | 8.35 |
| 0 | Pyrrolindino | Methyl | 1 | 164–167 | .70 | 10.33 | 10.31 |
| 0 | do | Propyl | 2 | 165–167 | .25 | 9.36 | 9.00 |
| 0 | do | Butyl | 1 | 173–175 | .70 | 8.95 | 8.94 |
| 0 | Piperidino | Ethyl | 1 | 173–177 | .25 | 9.36 | 9.10 |
| 0 | 2-Methylpiperidino | do | 1 | 184–186 | .80 | 8.94 | 8.88 |
| 0 | 4-Methylpiperidino | Methyl | 1 | 168–171 | .40 | 9.36 | 9.47 |
| 0 | do | Ethyl | 1 | 173–175 | .35 | 8.94 | 8.83 |
| 1 | Dimethylamino | do | 2 | 192–193 | 9.0 | 10.22 | 9.72 |
| 1 | do | Propyl | 2 | 148–150 | .60 | 9.75 | 9.83 |
| 1 | Diethylamino | Ethyl | 1 | 162–165 | .60 | 9.30 | 8.68 |
| 1 | do | Butyl | 1 | 180–185 | .50 | 8.50 | 8.48 |
| 1 | Dibutylamino | Ethyl | 1 | 185–188 | .30 | 7.84 | 7.64 |
| 1 | do | Propyl | 1 | 200–202 | .50 | 7.64 | 7.75 |
| 1 | do | Butyl | 1 | 181–182 | .15 | 7.27 | 6.64 |
| 1 | Morpholino | Methyl | | 168–170 | .25 | 9.30 | 8.98 |
| 1 | do | Ethyl | 1 | 210 | .30 | 8.88 | 8.64 |
| 1 | do | Butyl | 1 | 197–198 | .50 | 8.16 | 8.23 |
| 1 | Pyrrolidino | Propyl | 1 | 175–178 | .45 | 8.94 | 9.22 |
| 1 | Piperidino | Ethyl | 1 | 174–183 | .45 | 8.94 | 8.89 |
| 1 | do | Propyl | 1 | 187–189 | .45 | 8.56 | 8.56 |
| 1 | 2-Methylpiperidino | Butyl | 1 | 184–186 | .30 | 7.88 | 8.30 |
| 1 | 3-Methylpiperidino | Methyl | 1 | 175–178 | .40 | 8.94 | 9.23 |
| 1 | 4-Methylpiperidino | Ethyl | 1 | 178–180 | .45 | 8.56 | 8.70 |
| 2a | Diethylamino | Butyl | 1 | 180–184 | .50 | 8.16 | 8.18 |
| 2b | do | Ethyl | 1 | 161–166 | .50 | 8.89 | 8.63 |
| 2c | do | do | 1 | 162–168 | .30 | 8.89 | 8.70 |
| 2a | Dimethylamino | Butyl | 2 | 145–148 | .50 | 8.89 | 8.89 |
| 2b | Diethylamino | Methyl | 1 | 155–157 | .45 | 9.30 | 9.21 |
| 2a | Dipropylamino | do | 1 | 155–160 | .25 | 8.50 | 8.24 |
| 2b | do | Ethyl | 2 | 165–167 | .35 | 8.16 | 7.70 |

See footnotes at end of table.

Table—Continued

| n | B | R | Method | B.P., °C. | Pressure, mm. Hg | Titrable N, Percent* Calc'd | Titrable N, Percent* Found |
|---|---|---|---|---|---|---|---|
| 2b | Di-isopropylamino | ...do... | 1 | 185–187 | .45 | 8.16 | 7.96 |
| 2c | ...do... | ...do... | 1 | 175–180 | .40 | 8.16 | 7.87 |
| 2a | Dibutylamino | Methyl | 3 | 150–153 | .25 | 7.84 | 7.99 |
| 2b | ...do... | ...do... | 3 | 245–248 | 8.0 | 7.84 | 8.07 |
| 2a | ...do... | Ethyl | 1 | 173–175 | .10 | 7.54 | 7.80 |
| 2b | ...do... | ...do... | 1 | 188–190 | .50 | 7.54 | 7.38 |
| 2a | ...do... | Propyl | 3 | 168–170 | .18 | 7.27 | 7.43 |
| 2b | ...do... | ...do... | 1 | 170–173 | .10 | 7.27 | 7.07 |
| 2b | ...do... | Butyl | 3 | 195–197 | .10 | 7.01 | 7.33 |
| 2c | ...do... | ...do... | 1 | 188–191 | .35 | 7.01 | 7.02 |
| 2c | Ethylbutylamino | ...do... | 1 | 176–178 | .30 | 7.54 | 7.99 |
| 2b | Morpholino | Methyl | 3 | 175–177 | .25 | 8.88 | 8.62 |
| 2a | ...do... | Ethyl | 1 | 165–168 | .25 | 8.50 | 8.75 |
| 2b | ...do... | ...do... | 2 | 168–170 | .35 | 8.50 | 8.50 |
| 2b | ...do... | Propyl | 3 | 169–171 | .15 | 8.16 | 8.05 |
| 2a | ...do... | Butyl | 1 | 210–212 | .50 | 7.84 | 8.15 |
| 2b | ...do... | ...do... | 3 | 188–190 | .30 | 7.84 | 7.76 |
| 2c | ...do... | ...do... | 1 | 193–194 | .25 | 7.85 | 7.94 |
| 2b | Pyrrolidino | Methyl | 1 | 163–165 | .35 | 9.36 | 9.93 |
| 2b | ...do... | Ethyl | 2 | 162–163 | .45 | 8.94 | 8.84 |
| 2b | ...do... | Propyl | 1 | 180–182 | .80 | 8.56 | 9.07 |
| 2b | Piperidino | Ethyl | 1 | 193 | .20 | 8.56 | 8.57 |
| 2b | 2-Methylpiperidino | Methyl | 3 | 174–176 | .30 | 8.56 | 8.09 |
| 2c | ...do... | Ethyl | 1 | 175–177 | .45 | 8.21 | 8.24 |
| 2c | ...do... | Propyl | 1 | 178–180 | .30 | 7.88 | 7.84 |
| 2a | ...do... | Butyl | 1 | 182–185 | .45 | 7.58 | 7.82 |
| 2b | ...do... | ...do... | 1 | 185–188 | .45 | 7.58 | 7.75 |
| 2c | 3-Methylpiperidino | Methyl | 1 | 173–175 | .45 | 8.56 | 8.86 |
| 2b | ...do... | Ethyl | 1 | 168–170 | .25 | 8.21 | 8.00 |
| 2b | 4-Methylpiperidino | Butyl | 1 | 190–192 | .30 | 7.05 | 7.58 |
| 4 | Dimethylamino | Methyl | 2 | 145–147 | .40 | 9.30 | 9.36 |
| 4 | Diethylamino | ...do... | 1 | 163–165 | .30 | 8.50 | 8.33 |
| 4 | ...do... | Ethyl | 1 | 166–168 | .35 | 8.16 | 8.28 |
| 4 | Dibutylamino | Methyl | 1 | 170–175 | .40 | 7.27 | 7.27 |
| 4 | Morpholino | ...do... | 1 | 179–180 | .50 | 8.16 | 8.10 |
| 4 | ...do... | Propyl | 2 | 183–185 | .40 | 7.54 | 7.38 |
| 4 | ...do... | Butyl | 1 | 192–193 | .45 | 7.27 | 7.16 |
| 4 | Pyrrolidino | Propyl | 2 | 168–170 | .35 | 7.88 | 8.03 |
| 4 | Piperidino | Methyl | 1 | 170–172 | .45 | 8.21 | 8.38 |
| 4 | ...do... | Propyl | 1 | 186–188 | .50 | 7.58 | 7.31 |
| 4 | 3-Methylpiperidino | Butyl | 1 | 182–185 | .40 | 7.05 | 7.14 |
| 4 | 4-Methylpiperidino | Ethyl | 2 | 180–182 | .35 | 7.58 | 7.59 |
| 4 | ...do... | Butyl | 1 | 190–194 | .40 | 7.05 | 7.20 |

*Titrated with perchloric acid in acetic acid.
a Parent piperazine, trans 2,5 dimethyl.
b Parent piperazine, cis 2,5 dimethyl.
c Parent piperazine, 2,6-dimethyl.

The boiling points in the examples and in the table represent the ranges of temperature over which the samples were collected under widely varying conditions and are for identification purposes only and are not intended to limit the invention.

The compounds of the present invention are useful in medicine in that they possess important antitussive action. Also, the compounds are useful intermediates for chemical syntheses. They are cleaved by hydrolysis in acid solution to yield, after treatment with alkali, compounds of the structure

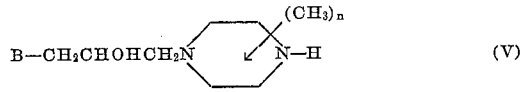

(V)

which are being included in another patent application now undergoing preparation.

The compounds of structure V are in turn valuable intermediates for the synthesis of pharmacologically active and useful compounds. For example, useful bronchial dilators of the structure

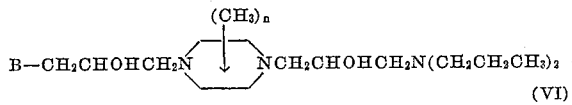

(VI)

are formed by the reaction of compounds of structure V with distilled

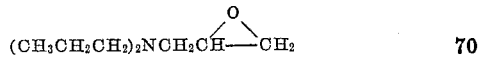

Thus, 1-(3-diethylamino-2-hydroxypropyl)-3,5-dimethylpiperazine reacts with 3-dipropylamino-1,2-epoxypropane to yield 1-(3-diethylamino-2-hydroxypropyl)-4-(3-dipropylamino-2-hydroxypropyl)-3,5-dimethylpiperazine, boiling at 188–191° C. at 0.35 mm. Hg.

The following equations are typical reactions of compounds of structure V to yield other useful products:

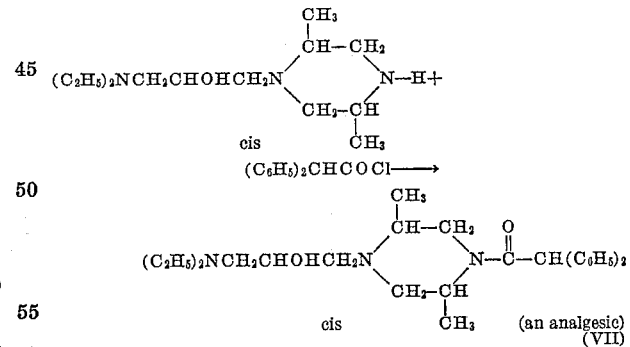

(an analgesic)
(VII)

The above amide was obtained in a yield of 91% by reaction in a well cooled ether solution.

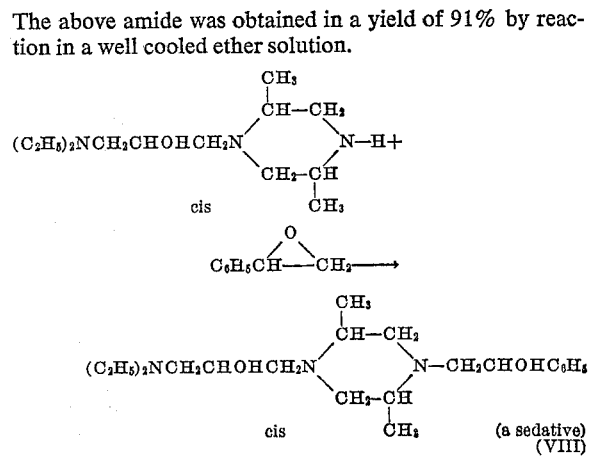

(a sedative)
(VIII)

The above unsymmetrical piperazine, boiling at 193–195° at 0.35 mm. was obtained in a yield of 68% by reaction with no solvent but in the presence of a trace of water. The mixture was allowed to stand for two days at room temperature with frequent mixing and then was heated in a water bath for 20 hours.

The specific compounds and methods disclosed herein are to be considered in all respects as illustrative and not restrictive, the scope of the invention being indicated by the appended claims rather than the foregoing description, and all specific compounds and methods which come within the meaning and range of equivalency of the claims are intended to be embraced therein.

What is claimed and desired to be secured by the United States Letters Patent is:

1. Compounds selected from the group consisting of (1) those having the formula

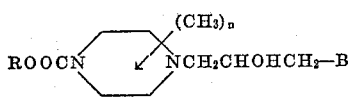

wherein R is an alkyl radical of from 1 to 4 carbons, $n$ is a whole number up to 4, including zero, and B is a member of the group consisting of morpholino, pyrrolidino, piperidino, monomethylpiperidino and

in which R' and R'' each is an alkyl radical of from 1 to 4 carbons and (2) the therapeutically useful acid addition salts thereof.

2. The compound

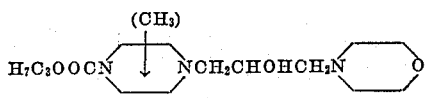

3. The compound

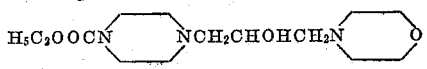

4. The compound

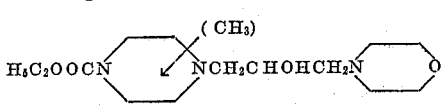

5. The compound

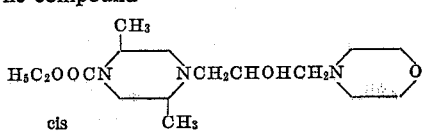

6. The compound

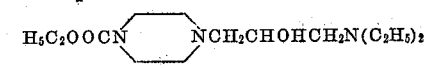

7. The compound

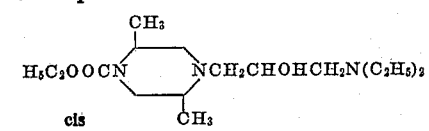

References Cited in the file of this patent

UNITED STATES PATENTS 2,870,145    Perron _____ Jan. 20, 1959

OTHER REFERENCES

Harfenist: Jour. Amer. Chem. Soc., vol. 79, pages 2211–215 (1957).

UNITED STATES PATENT OFFICE
CERTIFICATE OF CORRECTION

Patent No. 3,015,657                                                  January 2, 1962

Charles F. Geschickter et al.

It is hereby certified that error appears in the above numbered patent requiring correction and that the said Letters Patent should read as corrected below.

Column 2, lines 7 to 10, the lower right-hand portion of formula (1) should appear as shown below instead of as in the patent:

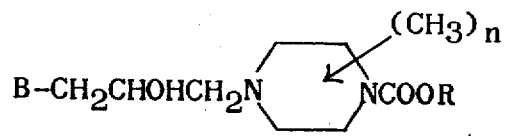

Signed and sealed this 19th day of June 1962.

(SEAL)
Attest:

ERNEST W. SWIDER                                            DAVID L. LADD
Attesting Officer                                                Commissioner of Patents